United States Patent
Griffin et al.

(10) Patent No.: US 8,804,318 B2
(45) Date of Patent: Aug. 12, 2014

(54) STORABLE KEYBOARD HAVING VARIABLE ANGULAR ORIENTATIONS

(75) Inventors: Jason Tyler Griffin, Kitchener (CA); Daniel Jordan Kayser, London (GB)

(73) Assignee: BlackBerry Limited, Waterloo (CA)

( * ) Notice: Subject to any disclaimer, the term of this patent is extended or adjusted under 35 U.S.C. 154(b) by 225 days.

(21) Appl. No.: 13/408,335

(22) Filed: Feb. 29, 2012

(65) Prior Publication Data
US 2013/0222981 A1 Aug. 29, 2013

(51) Int. Cl.
*G06F 1/16* (2006.01)

(52) U.S. Cl.
USPC ............... 361/679.12; 361/679.09; 455/575.4

(58) Field of Classification Search
USPC ............. 361/679.01, 679.09, 679.11, 679.12; 455/575.4
See application file for complete search history.

(56) References Cited

U.S. PATENT DOCUMENTS

| | | | | |
|---|---|---|---|---|
| 4,735,466 | A * | 4/1988 | Wolters et al. | 312/24 |
| 5,168,427 | A * | 12/1992 | Clancy et al. | 361/679.12 |
| 5,534,891 | A * | 7/1996 | Takano | 345/169 |
| 5,539,615 | A * | 7/1996 | Sellers | 361/679.12 |
| 5,742,475 | A * | 4/1998 | Riddiford | 361/679.09 |
| 5,754,395 | A * | 5/1998 | Hsu et al. | 361/679.11 |
| 5,764,474 | A * | 6/1998 | Youens | 361/679.12 |
| 5,818,360 | A * | 10/1998 | Chu et al. | 341/22 |
| 6,008,986 | A * | 12/1999 | Mok | 361/679.12 |
| 6,028,768 | A * | 2/2000 | Cipolla | 361/679.12 |
| 6,480,372 | B1 * | 11/2002 | Vong et al. | 361/679.09 |
| 6,665,173 | B2 * | 12/2003 | Brandenberg et al. | 361/679.09 |
| 6,747,635 | B2 * | 6/2004 | Ossia | 345/169 |
| 6,762,931 | B2 * | 7/2004 | Chen | 361/679.11 |
| 6,768,635 | B2 * | 7/2004 | Lai et al. | 361/679.11 |
| 6,771,493 | B2 * | 8/2004 | Chen | 361/679.11 |
| 6,853,543 | B1 * | 2/2005 | Moore et al. | 361/679.12 |
| 7,100,516 | B2 * | 9/2006 | Riddiford et al. | 108/50.01 |
| 7,187,537 | B2 * | 3/2007 | Liao | 361/679.09 |
| 7,342,776 | B1 * | 3/2008 | Chan | 361/679.27 |
| 7,567,433 | B2 * | 7/2009 | Chen | 361/679.26 |
| 7,599,721 | B2 * | 10/2009 | Taki et al. | 455/575.1 |
| 7,633,745 | B2 * | 12/2009 | Sakakibara et al. | 361/679.11 |
| 7,697,965 | B2 * | 4/2010 | Li | 455/575.4 |
| 7,889,483 | B2 * | 2/2011 | Sip et al. | 361/679.11 |
| 7,894,184 | B2 * | 2/2011 | Huang et al. | 361/679.48 |
| 8,467,838 | B2 * | 6/2013 | Griffin et al. | 455/575.3 |

(Continued)

OTHER PUBLICATIONS

Extended European Search Report from related European Patent Application No. 12157407.3; dated Jun. 12, 2012; 7 pages.

*Primary Examiner* — Lisa Lea Edmonds
(74) *Attorney, Agent, or Firm* — Fitch, Even, Tabin & Flannery LLP

(57) ABSTRACT

A keyboard moves between a stored position in a housing and a deployed position. The keyboard automatically has a first angular orientation with respect to the housing when in the stored position and a second, different angular orientation with respect to the housing when in the deployed position. The first angular orientation can comprise a substantially parallel orientation between the stored keyboard and the housing. The second angular orientation can be an angle from about five degrees to about forty-five degrees between the deployed keyboard and the housing's longitudinal axis. The apparatus can further include a tray. This tray slides in and out of the housing in order to move the keyboard between the stored position and the deployed position. One end of the keyboard can hingeably couple to the tray. The housing can include at least one slot to receive a keyboard post and guide movement of the tray.

14 Claims, 3 Drawing Sheets

(56) References Cited

U.S. PATENT DOCUMENTS

| | | |
|---|---|---|
| 8,542,486 B2 * | 9/2013 | Lin et al. .................. 361/693 |
| 2002/0126441 A1 * | 9/2002 | Kuo et al. .................. 361/680 |
| 2003/0064688 A1 | 4/2003 | Mizuta et al. |
| 2005/0052831 A1 * | 3/2005 | Chen .......................... 361/680 |
| 2006/0053847 A1 | 3/2006 | Taki et al. |
| 2006/0120029 A1 * | 6/2006 | Ryu et al. .................. 361/680 |
| 2010/0281441 A1 | 11/2010 | Eldon et al. |
| 2012/0146914 A1 * | 6/2012 | Pegg .......................... 345/169 |

* cited by examiner

STORABLE KEYBOARD HAVING VARIABLE ANGULAR ORIENTATIONS

FIELD OF TECHNOLOGY

The present disclosure relates to electronic devices and more particularly to keyboards.

BACKGROUND

Data and instruction-entry keyboards of various kinds are known in the art. Keyboards are typically comprised of a plurality of keycaps (such as depressible buttons, touch-sensitive surfaces, and so forth) that permit a user to selectively enter any of a variety of alphanumeric characters and/or to input corresponding instructions or selections. Two common examples in these regards are the so-called QWERTY keyboard and the so-called telephone keypad.

Small portable communication devices (such as so-called smartphones) often include a keyboard. To minimize the device's footprint those keyboards are sometimes disposed on a lower plane than the device's display. In these cases the display and the keyboard sometimes slide parallel to one another to bring the keyboard into a deployed position. In some other cases the keyboard comprises two or more multi-row segments that pivot in a planar fashion with respect to one another to permit the keyboard segments to be stored, again parallel to the device's display, as a stack of planar members within the device.

Though useful in many instances, such approaches do not meet all requirements for all application settings.

DETAILED DESCRIPTION

Figure 1:
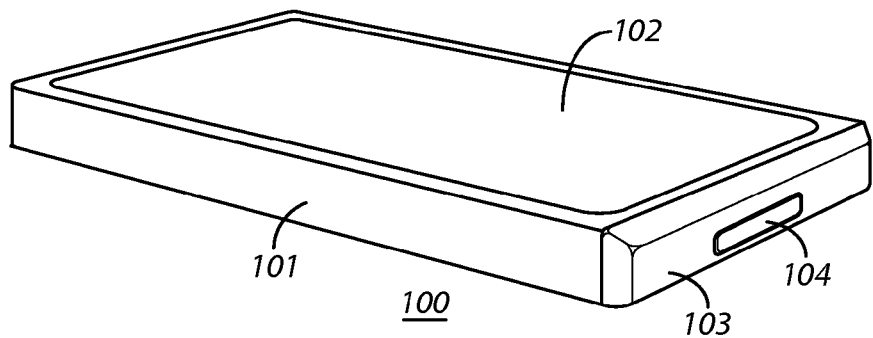
FIG. 1 is a perspective schematic view in accordance with the disclosure.

The following describes an apparatus having a housing and a keyboard. The keyboard can move between a stored position in the housing and a deployed position. The keyboard automatically has a first angular orientation with respect to the housing when in the stored position and a second, different angular orientation with respect to the housing when in the deployed position.

By one approach the first angular orientation comprises a substantially parallel orientation between the stored keyboard and the housing. The second angular orientation, by way of contrast, is different. For example, depending upon the needs and/or requirements of the application setting, the second angular orientation can be an angle from about five degrees to about forty-five degrees between the deployed keyboard and the housing's longitudinal axis.

To facilitate the foregoing movement of the keyboard, by one approach the apparatus can further include a tray. By one approach this tray slides in and out of the housing in order to move the keyboard between the stored position and the deployed position. If desired, one end of the keyboard hingeably couples to the tray. The aforementioned housing can include, if desired, at least one slot formed therein to receive and guide a keyboard post between the aforementioned angular positions as the tray moves back and forth between a closed position and an opened position.

By one approach, the tray can lock in the closed and/or the opened position. An unlocking mechanism can serve to unlock the tray to permit desired movement. This unlocking mechanism can include a user-accessible push button.

So configured, a corresponding device such as a portable communication device can have both a small footprint when the keyboard is non-deployed while also offering a keyboard that can be readily and easily deployed when needed. The keyboard can by stored substantially parallel to the longitudinal axis of the housing and automatically assume a non-planar, non-parallel orientation upon being deployed. This can serve, for example, to incline the keyboard towards the user to thereby permit easier viewing of the keyboard and informed, comfortable manipulation of the keyboard. These teachings are highly leverageable and are also easily scaled to accommodate a wide variety of device types and application settings.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
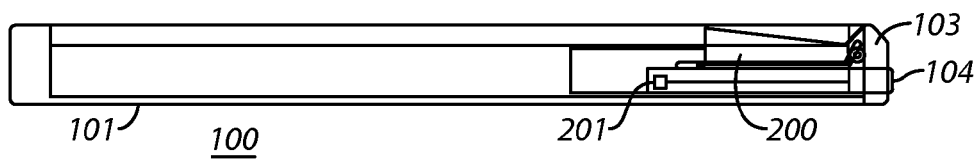
FIG. 2 is a side-elevational schematic view in accordance with the disclosure.

FIGS. 1 and 2 present an illustrative example of an apparatus 100 configured pursuant to these teachings. It will be understood that the specifics of this example are intended to serve an illustrative purpose and are not intended to suggest any particular corresponding limitations as regards the practice of these teachings.

Figure 3:
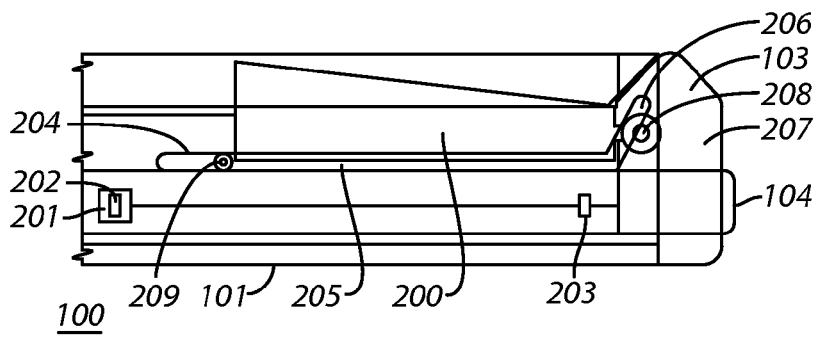
FIG. 3 is a side-elevational detail schematic view in accordance with the disclosure.

In this illustrative example the apparatus 100 comprises a housing 101 that supports a display 102 such that the display 102 faces outwardly and away from a front side of the housing 101. The apparatus 100 also includes a tray 103 configured to slide in and out of housing 101 in order to move a keyboard 200 between a stored or closed position (as shown in FIGS. 1, 2, and 3) and an open or deployed position (described and illustrated below). As shown in FIG. 1, in this illustrative example the tray 103 comprises an entire side of the housing 101 (in this case, a side of the housing 101 disposed at the presumptive bottom of the display 102 (presuming a portrait-based orientation of the display 102)).

If desired, a locking mechanism 201 can be configured to automatically lock the tray 103 in the stored position shown in FIGS. 1, 2, and 3 and/or in a fully-deployed position as described further below. This locking mechanism 201 can comprise, for example, an interlocking tab that interacts with a corresponding detent, tab, or other suitable surface 202 as provided, for example, on an interior wall of the housing 101. By one approach, this locking mechanism 201 can couple to an unlocking mechanism such as a push button 104 that responds to an externally-applied force (such as a user's applied finger) to unlock the locking mechanism 201 to thereby permit movement of the tray 103 and hence the keyboard 200.

In this illustrative example the interior-facing side walls of the housing 101 include a slot 204 formed therein. These slots 204 have a first portion 205 that comprises the larger portion of the slot 204 and which runs at least substantially straight and parallel to the longitudinal axis of the housing 101. A second portion 206 of each slot 204 then proceeds upwardly towards the front surface of the housing 101 at a non-perpendicular angle. The particular angle selected can vary with the needs and/or opportunities as tend to characterize a given application setting. In this particular illustrated example the angle is steep in order to quickly move the keyboard 200 to a corresponding angled deployed position as described below.

The keyboard 200 hingeably couples to the tray 103 (in particular, to the front edge 207 of the tray 103) by one or more hinges 208. So configured, the keyboard 200 can pivot about the hinge 208 with respect to the tray 103.

The keyboard 200 also includes, in this illustrative embodiment, a post 209 that extends outwardly and laterally on either side of the keyboard 200 near the trailing edge thereof. These posts 209 are configured to fit within the aforementioned slots 204. (If desired, these posts 209 can serve as an axle for a wheel that fits within the slot 204.) So configured, these posts 209 and slots 204 serve to guide the movement of the keyboard 200 when moving the keyboard 200 from a stored, closed position to a deployed, opened position. The specifics of this movement in this illustrative example are described as follows.

As shown in FIGS. 2 and 3, when in the closed, stored position the keyboard 200 assumes a first angular position with respect to the housing 101 and tray 103. This angular position is essentially zero degrees as the keyboard 200 is essentially parallel and coplanar to both the housing 101 and the tray 103.

Figure 4:
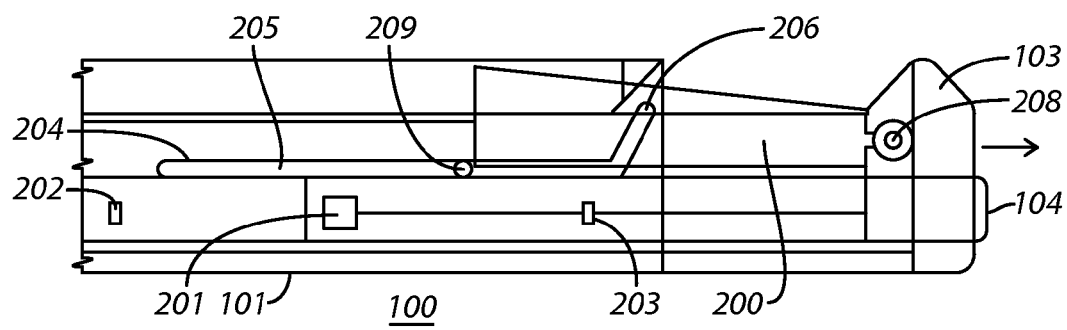
FIG. 4 is a side-elevational detail schematic view in accordance with the disclosure.
Figure 5:
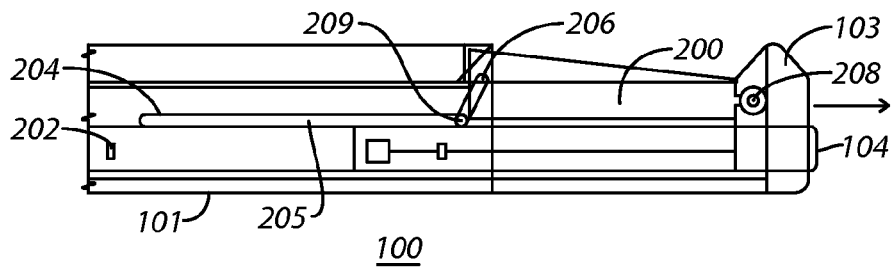
FIG. 5 is a side-elevational detail schematic view in accordance with the disclosure.

As shown in FIGS. 4 and 5, the keyboard 200 maintains this first angular position even as the tray 103 (and, hence, the keyboard 200) slides towards an opened, deployed position. This maintained orientation occurs at least in part due to the keyboard posts 209 tracking the housing slots 204. Since these slots 204 run essentially parallel to the longitudinal axis of the housing 101, so too moves the keyboard 200.

Figure 6:
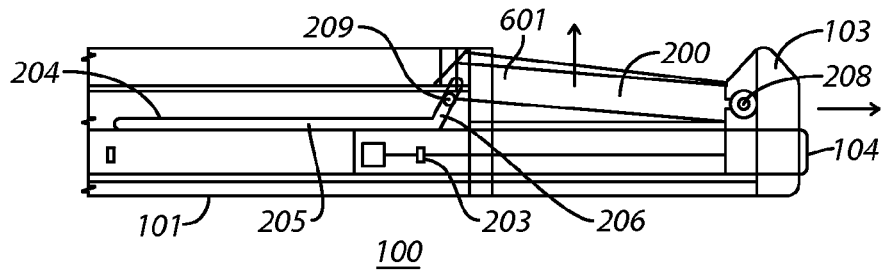
FIG. 6 is a side-elevational detail schematic view in accordance with the disclosure.

As the tray 103 nears its fully-withdrawn position as shown in FIG. 5, the keyboard posts 209 reach the junction between the coplanar portion 205 of the slots 204 and the angled portion 206. As illustrated in FIG. 6, as the tray 103 continues sliding outwardly of the housing 101 the keyboard post 209 now moves upwardly along that angled portion 206 of the slot 204. This upward tracking, in turn, causes the keyboard 200 to pivot about the hinged connection with the tray 103 such that the unhinged end 601 of the keyboard 200 pivots upwardly towards the front surface of the housing 101.

Figure 7:
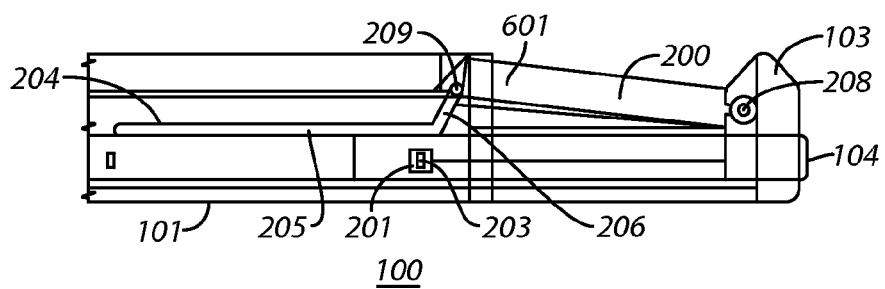
FIG. 7 is a side-elevational detail schematic view in accordance with the disclosure.
Figure 8:
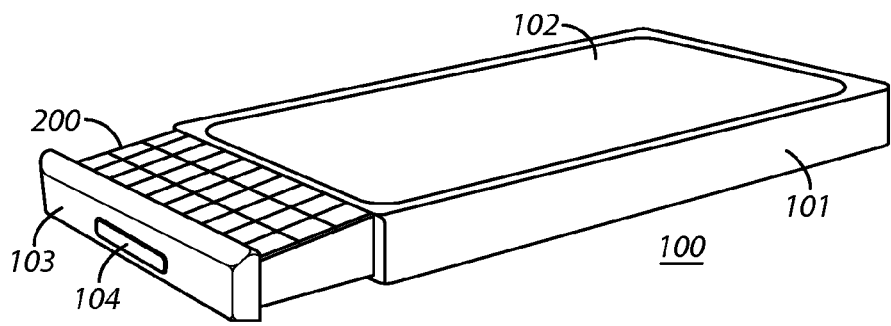
FIG. 8 is a perspective schematic view in accordance with the disclosure.

When the tray 103 stops at a fully-opened position as shown in FIGS. 7 and 8, the keyboard 200 stops its pivoting movement as well. This leaves the keyboard 200 in a deployed position with the keyboard 200 deployed at an angular orientation that is different than its stored angular orientation. The specific angle employed in these regards can again vary with the specific application setting. By one approach, this deployed angle can be angle from about five degrees to about forty-five degrees between the deployed keyboard 200 and the housing 101 (i.e., the longitudinal axis of the housing 101).

In this specific example, a first edge of the keyboard 200 (i.e., the edge that is opposite the hinged edge) is substantially coincident with a first edge (i.e., a bottom edge of the front-facing surface) of the housing 101 when the keyboard 200 is fully deployed. These teachings are suitable for use with a wide variety of keyboards. As shown in FIG. 8, the keyboard 200 can include as many, or as few, physically discrete keys as may be desired to meet the needs of a given application setting. As a more specific example in these regards, but without intending any limitations in these regards, the keyboard 200 can comprise a full QWERTY keyboard if desired.

If desired, the aforementioned locking mechanism 201 can interact with another housing formation 203 (such as another detent, tab, or other surface configured to suitably interact with the locking mechanism 201) to lock the tray 103 (and hence the keyboard 200) in the fully-deployed position. In such a case, the aforementioned unlocking mechanism push button 104 can again serve as a mechanism to release the lock to permit the tray 103 to be moved back to a closed orientation. Upon closing the tray 103, the keyboard 200 reverses the movements described above and hence pivots downwardly to a coplanar orientation and then remains coplanar to the housing 101 as the tray 103 and keyboard 200 slide inwardly of the housing 101 to a closed, stored position.

So configured, the apparatus 100 has a relatively small footprint when the keyboard 200 is stored in a non-deployed configuration. As the tray 103 moves outwardly, however, the keyboard 200 moves as described to a deployed configuration. The non-planar, angled, deployed orientation of the keyboard 200 with respect to the display 102 can facilitate ease of use while also offering a desirable visual aesthetic.

Figure 9:
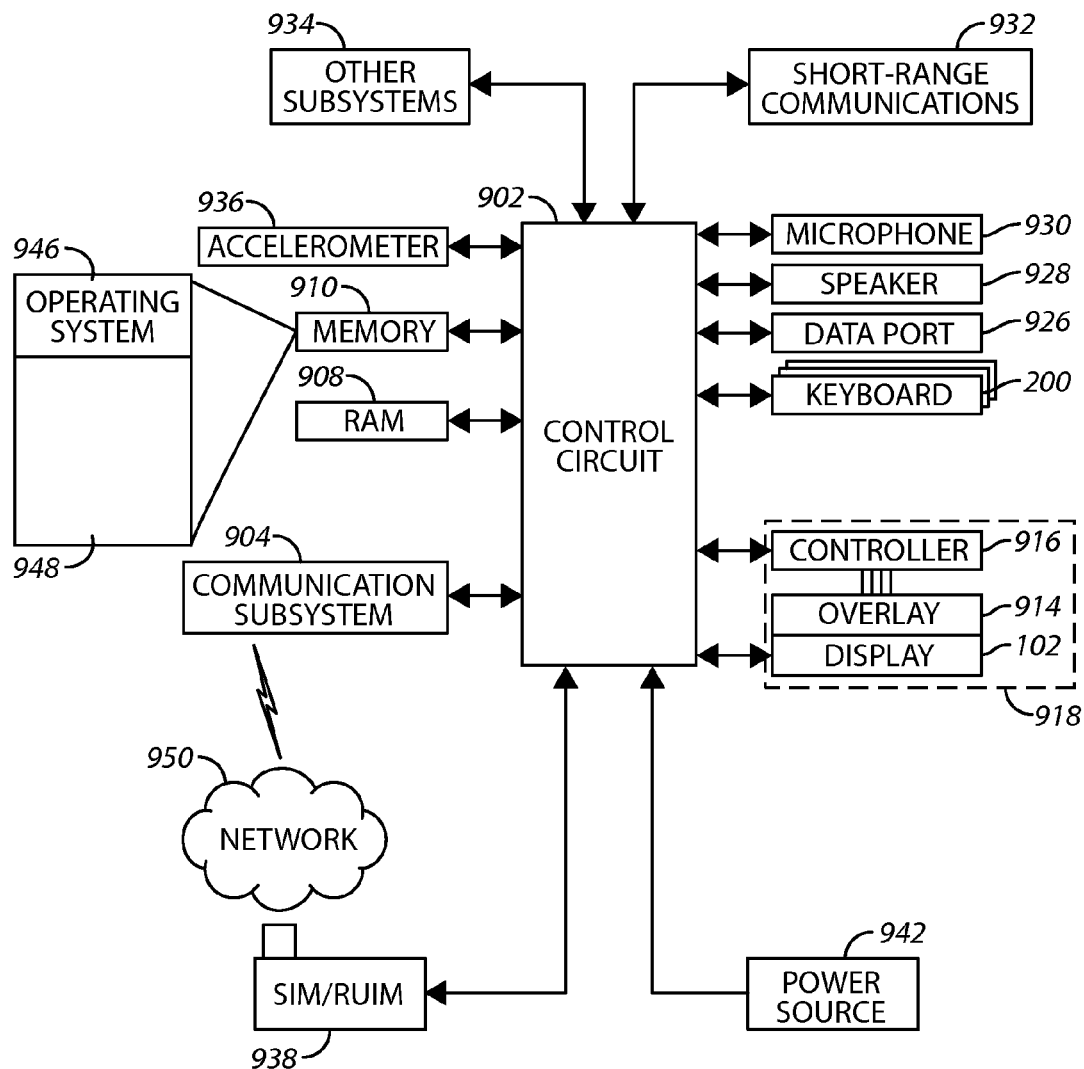
FIG. 9 is a block diagram in accordance with the disclosure.

These teachings are suitable for use with a wide variety of apparatuses. This can include, for example, a portable electronic device such as a portable communications device of choice. Referring to FIG. 9, an exemplary portable electronic device includes a control circuit 902 that controls the overall operation of the portable electronic device. Communication functions, including data and voice communications, are performed through a communication subsystem 904. The communication subsystem receives messages from and sends messages to a wireless network 950. The wireless network 950 may be any type of wireless network, including, but not limited to, data wireless networks, voice wireless networks, and networks that support both voice and data communications. A power source 942, such as one or more rechargeable batteries or a port to an external power supply, powers the electronic device.

The control circuit 902 interacts with other elements, such as a Random Access Memory (RAM) 908, a memory 910, the aforementioned display 102 along with a touch-sensitive overlay 914 operably coupled to an electronic controller 916 that together comprise an optional touch-sensitive display 918, the aforementioned keypad 200, a data port 926, a speaker 928, a microphone 930, a short-range communication subsystem 932, and other device subsystems 934 of choice (such as, for example, one or more sensors that detect when the tray 103 and/or keyboard 200 are stored and/or deployed).

In this example, the control circuit 902 also interacts with an accelerometer 936 that may be utilized to detect direction of gravitational forces or gravity-induced reaction forces. To identify a subscriber for network access, the portable electronic device may utilize a Subscriber Identity Module or a Removable User Identity Module (SIM/RUIM) card 938 for communication with a network, such as the wireless network 950. Alternatively, user identification information may be programmed into the memory 910.

The portable electronic device includes an operating system 946 and software programs, applications, or components 948 that are executed by the control circuit 902 and are typically stored in a persistent, updatable store such as the memory 910. Additional applications or programs may be loaded onto the portable electronic device through the wireless network 950, the data port 926, the short-range communications subsystem 932, or any other suitable subsystem 934. The memory 910 may comprise a non-transitory storage media that stores executable code, when executed, causes one or more functions or actions of choice to be undertaken.

By one approach, the control circuit 902 can be configured to automatically respond to the deployed and non-deployed state of the keyboard 200 (via, for example) the aforementioned sensor) in any of a variety of ways. As one simple example in these regards, when the keyboard 200 is fully deployed the control circuit 902 can present, via the display 102, a user interface that presumes data entry via the keyboard 200. When, however, the keyboard 200 is stowed in the non-deployed configuration as described above, the control circuit 902 can be configured to automatically present instead a user interface that presumes data entry via the touch-based overlay 914.

Such an apparatus 100 provides a relatively small device to have a display-only front surface when desired while also providing a genuine keyboard 200 when the user desires. As the keyboard 200 is integral to the apparatus 100 the keyboard 200 is always available and does not require, for example, any Bluetooth programming, set-up time, or corresponding power consumption.

The present disclosure may be embodied in other specific forms without departing from its spirit or essential characteristics. As but one illustrative example in these regards, the tray 103 can be further configured to pivot with respect to the housing 101 to thereby permit the leading-edge of the keyboard 200 to pivot upwardly in the deployed position so that the keyboard 200 assumes a coplanar, flat orientation with respect to the display 102.

The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
   a housing;
   a keyboard configured to move between a stored position in the housing and a deployed position, wherein the keyboard automatically has a first angular orientation with respect to the housing when in the stored position and an automatic second angular orientation with respect to the housing when in the deployed position and wherein the first and second angular orientations are different from one another; and
   a tray configured to slide in and out of the housing in order to move the keyboard between the stored position and the deployed position.

2. The apparatus of claim 1 wherein the apparatus comprises a portable communications device.

3. The apparatus of claim 2 wherein the second angular orientation comprises an angle from five degrees to forty-five degrees between the deployed keyboard and the housing.

4. The apparatus of claim 1 further comprising:
   a display supported by the housing facing outwardly away from a front side of the apparatus.

5. The apparatus of claim 1 wherein the keyboard comprises, at the least, a QWERTY keyboard.

6. The apparatus of claim 1 wherein the first angular orientation comprises a substantially parallel orientation between the stored keyboard and the housing.

7. The apparatus of claim 1 wherein the tray comprises an entire side of the housing.

8. The apparatus of claim 1 wherein the keyboard is hingeably coupled to the tray.

9. The apparatus of claim 1 further comprising:
   a locking mechanism configured to automatically lock the keyboard in the deployed position.

10. The apparatus of claim 9 wherein the locking mechanism comprises an interlocking tab.

11. The apparatus of claim 9 further comprising:
    an unlocking mechanism responsive to an externally-applied force and configured to unlock the locking mechanism in response to that externally-applied force to thereby permit the keyboard to be moved to the stored position.

12. The apparatus of claim 11 wherein the unlocking mechanism includes a push button.

13. The apparatus of claim 1 wherein a first edge of the keyboard is substantially coincident with a first edge of the housing when the keyboard is in the deployed position.

14. An apparatus comprising:
    a housing;
    a keyboard configured to move between a stored position in the housing and a deployed position, wherein the keyboard automatically has a first angular orientation with respect to the housing when in the stored position and an automatic second angular orientation with respect to the housing when in the deployed position and wherein the first and second angular orientations are different from one another;
    a tray configured to slide in and out of the housing in order to move the keyboard between the stored position and the deployed position, wherein the keyboard is hingeably coupled to the tray;
    and wherein the housing includes at least one slot formed therein and the keyboard includes at least one post configured to fit within the slot to thereby facilitate guiding the keyboard from the first angular position to the second angular position when sliding the tray from a closed position to an opened position.

* * * * *